(12) United States Patent
Way et al.

(10) Patent No.: US 9,453,447 B2
(45) Date of Patent: *Sep. 27, 2016

(54) INJECTOR MOUNTING CONFIGURATION FOR AN EXHAUST TREATMENT SYSTEM

(71) Applicant: Donaldson Company, Inc., Minneapolis, MN (US)

(72) Inventors: Paul Anthony Way, New Brighton, MN (US); Phebe Preethi, Bloomington, MN (US); Nathan Zambon, Eagan, MN (US); Andrew Alan Gilb, Prior Lake, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/281,326

(22) Filed: May 19, 2014

(65) Prior Publication Data

US 2015/0047329 A1 Feb. 19, 2015

Related U.S. Application Data

(63) Continuation of application No. 12/617,301, filed on Nov. 12, 2009, now Pat. No. 8,726,643.

(60) Provisional application No. 61/114,119, filed on Nov. 13, 2008.

(51) Int. Cl.
*F01N 3/20* (2006.01)
*F01N 3/28* (2006.01)
*F01N 13/18* (2010.01)

(52) U.S. Cl.
CPC .............. *F01N 3/28* (2013.01); *F01N 3/2066* (2013.01); *F01N 13/18* (2013.01); *F01N 2240/20* (2013.01); *F01N 2610/1453* (2013.01); *Y02T 10/24* (2013.01)

(58) Field of Classification Search
CPC ........ F01N 3/2066; F01N 3/28; F01N 13/18; F01N 2240/20; F01N 2610/1453; Y02T 10/24
USPC ........................... 60/286, 295, 301, 303, 324
See application file for complete search history.

(56) References Cited

U.S. PATENT DOCUMENTS 3,608,532 A 9/1971 Balluff
4,454,847 A 6/1984 Isomura et al.
(Continued)

FOREIGN PATENT DOCUMENTS

DE 102005061145 A1 * 6/2007 ........... F01N 3/2066
DE 20 2008 001 547 U1 4/2008
(Continued)

OTHER PUBLICATIONS

Figure 1 labeled Prior Art from current (U.S. Appl. No. 12/617,301) shows a prior art configuration for mounting an injector to an exhaust pipe, 1 page (Publicly known at least as early as Nov. 13, 2008).

(Continued)

*Primary Examiner* — Audrey K Bradley
(74) *Attorney, Agent, or Firm* — Merchant & Gould P.C.

(57) ABSTRACT

The present disclosure relates to a device for mounting an injector to an exhaust pipe. The device includes an injector mounting structure having an exterior surface configured for mounting the injector. The injector mounting structure also includes an interior surface arrangement defining an interior volume and a port for allowing the injector to inject a reductant into the interior volume. The interior surface arrangement is configured to prevent swirling of exhaust within the interior volume.

4 Claims, 6 Drawing Sheets

(56) References Cited

U.S. PATENT DOCUMENTS

| | | |
|---|---|---|
| 5,082,184 A | 1/1992 | Stettner et al. |
| 5,239,969 A | 8/1993 | Beaty |
| 5,968,464 A | 10/1999 | Peter-Hoblyn et al. |
| 6,074,619 A | 6/2000 | Schoubye |
| 6,312,650 B1 | 11/2001 | Frederiksen et al. |
| 6,401,449 B1 * | 6/2002 | Hofmann ............... F01N 3/2066 423/212 |
| 6,415,602 B1 | 7/2002 | Patchett et al. |
| 6,444,177 B1 | 9/2002 | Müller et al. |
| 6,449,947 B1 | 9/2002 | Liu et al. |
| 6,513,323 B1 | 2/2003 | Weigl et al. |
| 6,996,976 B2 | 2/2006 | Rumminger et al. |
| 7,168,241 B2 | 1/2007 | Rudelt et al. |
| 2005/0013756 A1 | 1/2005 | Amou et al. |
| 2007/0163241 A1 | 7/2007 | Meingast et al. |
| 2008/0011777 A1 | 1/2008 | Cooke |
| 2008/0022663 A1 | 1/2008 | Dodge et al. |
| 2008/0134671 A1 | 6/2008 | Nefischer |
| 2009/0019843 A1 | 1/2009 | Levin et al. |
| 2009/0158717 A1 | 6/2009 | Kimura et al. |
| 2010/0098604 A1 | 4/2010 | Drost et al. |
| 2010/0107614 A1 | 5/2010 | Levin et al. |
| 2010/0170233 A1 | 7/2010 | Tangemann et al. |
| 2010/0212292 A1 | 8/2010 | Rusch et al. |
| 2011/0094206 A1 | 4/2011 | Liu et al. |

FOREIGN PATENT DOCUMENTS

| | | | |
|---|---|---|---|
| DE | 10 2006 059 507 A1 | 6/2008 | |
| FR | 2900440 A3 | 11/2007 | |
| FR | 2 913 069 A3 | 8/2008 | |
| WO | WO 2008034941 A1 * | 3/2008 | ............... F01N 3/28 |
| WO | WO 2009/085641 A1 | 7/2009 | |

OTHER PUBLICATIONS

Hesser, M. et al., "SCR Technology for NOx Reduction: Series Experience and State of Development," *DEER Conference*, pp. 1-29 (Aug. 21-25, 2005).

Jean, E. et al., "SCR Integration for Exhaust Systems in Passenger Cars," *6th International CTI-Forum—Exhaust Systems*, pp. 1-40 (Jan. 30, 2008).

SCR Catalytic Converter, http://rb-kwin.bosch.com/us/en/powerconsumptionemissions/exhaust-gastreatment/dieselengines/exhaust-gasmanagement/denoxtronic/scrcatalyticconverter.html, 1 page (Publicly known at least as early as Oct. 24, 2008).

Belloir et al., English Abstract of FR 2,900,440 A1, Nov. 2, 2007.

Haeberer et al., Machine Translation of DE 102005061145 A1, Jun. 28, 2007.

International Search Report and Written Opinion mailed Jan. 28, 2010.

* cited by examiner

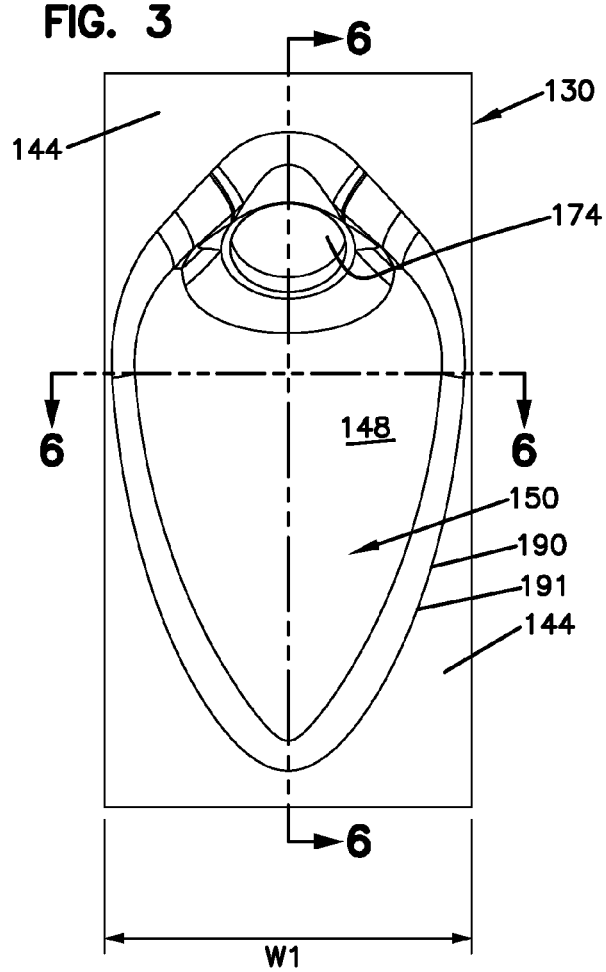
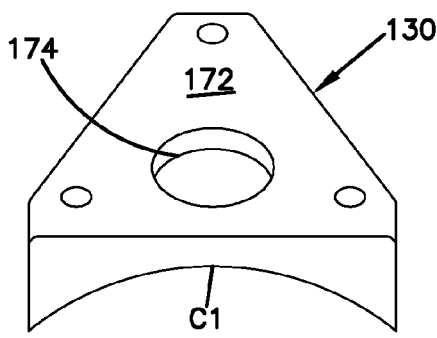
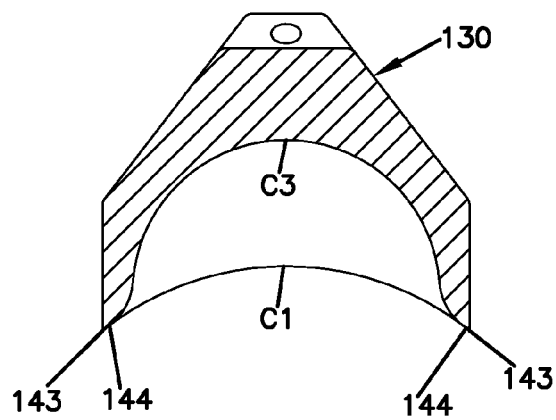
FIG. 3
FIG. 4
FIG. 5

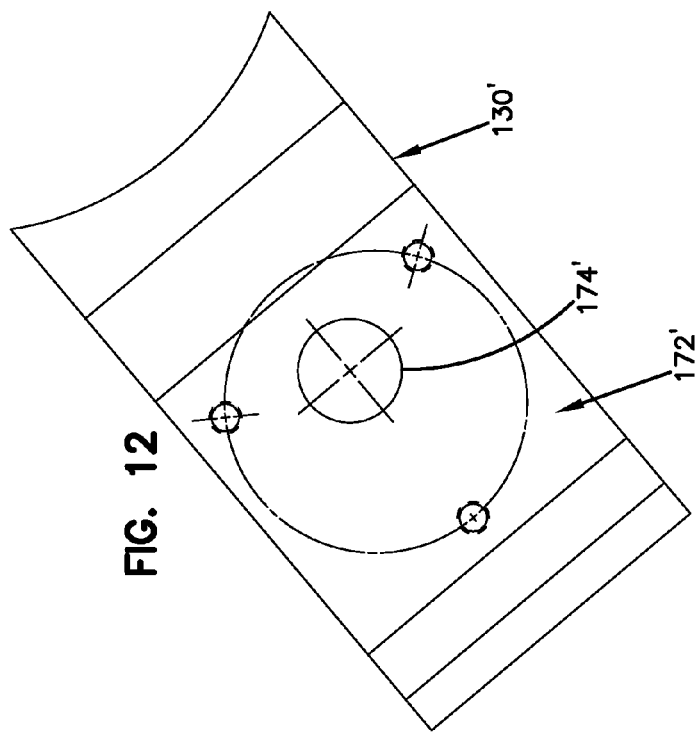
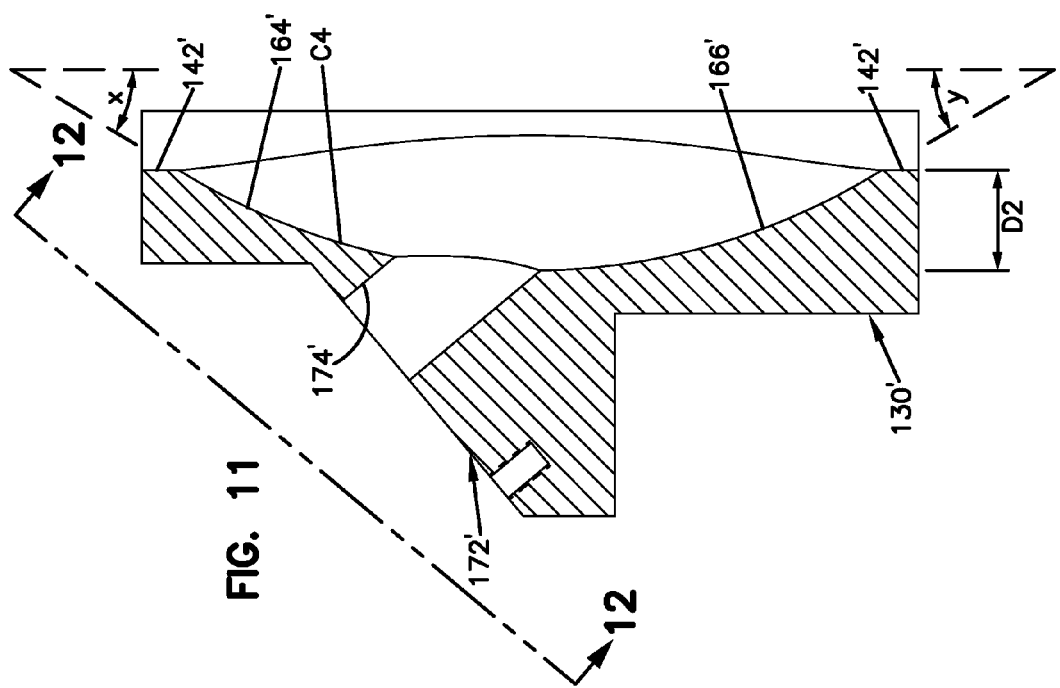

INJECTOR MOUNTING CONFIGURATION FOR AN EXHAUST TREATMENT SYSTEM

CROSS REFERENCE TO RELATED APPLICATION

This application is a continuation of application Ser. No. 12/617,301, filed Nov. 12, 2009, now U.S. Pat. No. 8,726,643, which application claims the benefit of provisional application Ser. No. 61/114,119, filed Nov. 13, 2008, which applications are incorporated herein by reference in their entirety

TECHNICAL FIELD

The present disclosure relates generally to exhaust treatment systems for controlling exhaust emissions. More particularly, the present disclosure relates to systems for reducing NOx emissions from engine exhaust.

BACKGROUND

Selective catalytic reduction (SCR) systems are used to treat engine exhaust to provide a reduction in NOx emissions. Many SCR systems use ammonia as a reductant for reducing NOx to $N_2$. A typical SCR system includes a substrate having a catalyst such as vanadium, titanium, platinum or other precious metal. In a typical NOx reduction reaction, the catalyst provided on the substrate promotes the reaction of ammonia with NOx to form $N_2$ and $H_2O$. This reaction is favored by the presence of excess oxygen.

In certain SCR systems, a urea-water solution is provided as a reductant source for use in the reduction of NOx. However, to function as an effective reductant, the urea-water solution must be decomposed into a useable reductant form (i.e., ammonia). To decompose the urea-water solution, the water in the solution is first removed through vaporization. Next, the urea decomposes via thermolysis to form isocyanic acid (HNCO) and ammonia ($NH_3$). Finally, the HNCO decomposes via hydrolysis to form $NH_3$ and carbon dioxide.

A problem with urea-based SCR systems is that urea and urea-by-product (e.g., cyanuric acid, biuret, melamine, ammelide, and ammeline) deposits can be formed within the exhaust system when decomposition of the injected urea-water solution is incomplete. This deposition of urea and urea-by-products is particularly problematic when the urea-water solution sprayed into the exhaust system is exposed to relatively low temperatures.

SUMMARY

One aspect of the present disclosure relates to an exhaust treatment system for treating engine exhaust. The exhaust treatment system includes a reductant dispensing location at which a reductant is introduced into the exhaust being treated. In one embodiment, the reductant dispending location is configured to reduce the likelihood that the reductant or by-products from the reductant are deposited in significant amounts within the exhaust system.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIG. 3 is a bottom plan view of the underside of an injector mounting structure in accordance with the principles of the present disclosure;

FIG. 4 is an upstream end view of the injector mounting structure of FIG. 3;

FIG. 5 is a cross-sectional view taken along section line 5-5 of FIG. 3;

FIG. 11 is a cross-sectional view taken along section line 11-11 of FIG. 8; and

FIG. 12 is a plan view taken from section line 12-12 of FIG. 11.

DETAILED DESCRIPTION

The present disclosure relates generally to exhaust treatment systems for controlling engine emissions (e.g., diesel engine emissions). In certain embodiments, exhaust treatment systems in accordance with the principles of the present disclosure include SCR systems used to control NOx emissions generated from engines such as on-road or off-road diesel engines. Certain embodiments of the present disclosure include reductant dispensers (e.g., injectors) that dispense (e.g., spray) reductants into an exhaust stream being treated by the exhaust treatment system. In preferred embodiments of the present disclosure, the exhaust treatment system is configured to reduce the likelihood for the reductant or by-products of the reductant to form deposits at locations within the exhaust system. In one embodiment of the present disclosure, the reductant dispensed into the exhaust treatment system includes urea (e.g., a urea-water solution). However, it will be appreciated that the various aspects of the disclosure can also be applied to exhaust treatment systems dispensing other types of reductants or other reactants.

Figure 1:
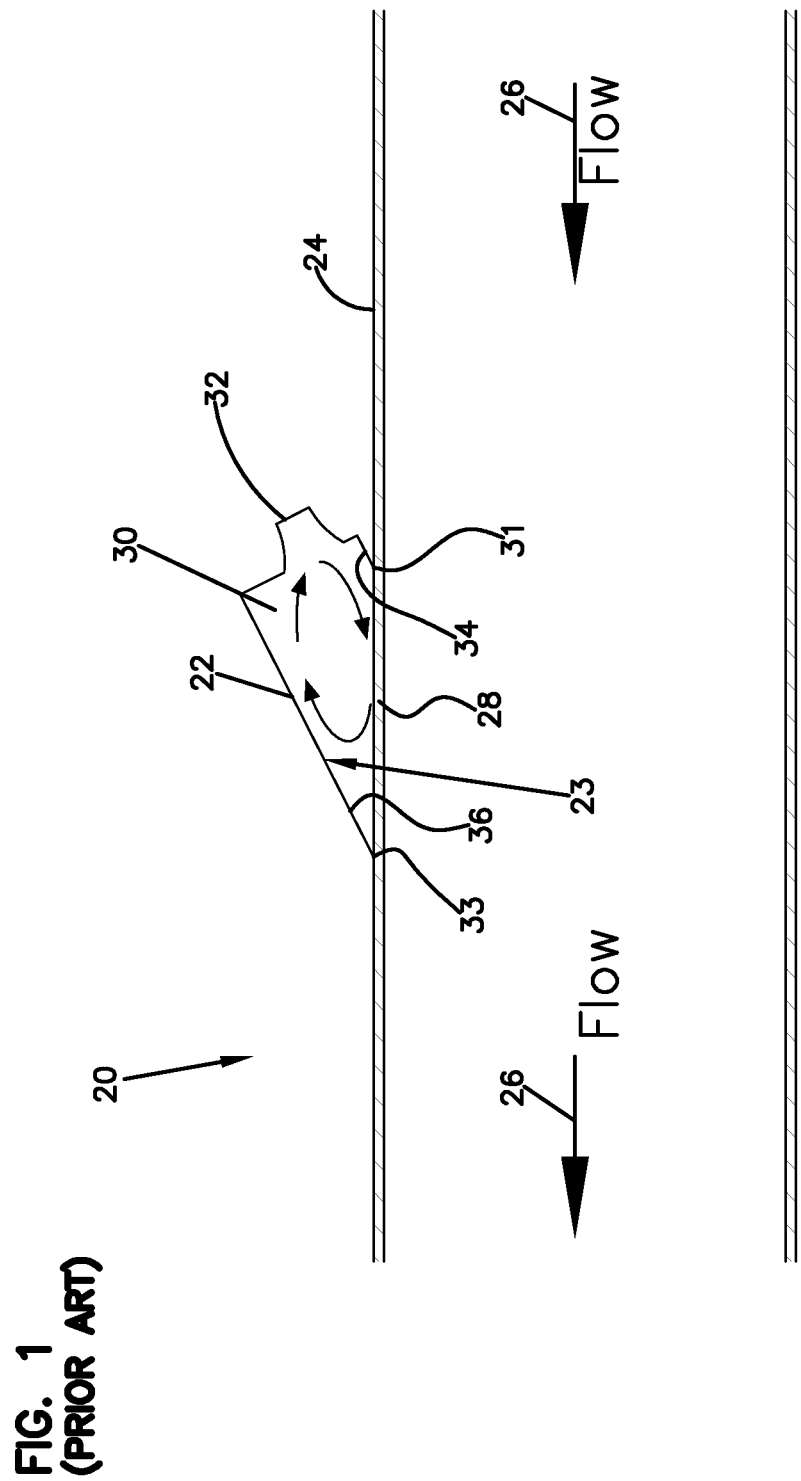
FIG. 1 shows a prior art configuration for mounting an injector to an exhaust pipe.

FIG. 1 shows a prior art exhaust treatment system 20 including an injector stand-off tube 22 mounted to an exhaust pipe 24 through which exhaust in need of treatment is conveyed. The exhaust is conveyed through the exhaust pipe 24 in the direction indicated by arrows 26. The stand-off tube 22 is mounted to the exhaust pipe 24 at a location in which the stand-off tube 22 covers an opening 28 defined through the wall of the exhaust pipe 24. The stand-off tube 22 includes an interior surface arrangement 23 that defines an interior volume 30. The interior volume 30 of the stand-off tube 22 is in fluid communication with the interior of the pipe 24 through the opening 28. The stand-off tube 22 includes an injector mounting location 32 at which an injector for injecting reductant can be mounted. An injector mounted at the injector mounting location 32 is adapted to spray reductant (e.g., via a nozzle) into the interior volume 30 of the stand-off tube 22.

Referring still to FIG. 1, the interior surface arrangement 23 of the stand-off tube 22 includes an upstream interior surface 34 positioned at an upstream end 31 of the opening 28 and a downstream interior surface 36 positioned at a downstream end 33 of the opening 28. The upstream interior surface 34 starts at the upstream end 31 of the opening 28 and angles away from the pipe 24 in a direction opposite to the direction 26 of exhaust flow through the exhaust pipe 24. The downstream wall 36 starts at the downstream end 33 of the opening 28 and angles away from the exhaust pipe 24 in a direction opposite to the exhaust flow direction 26. This configuration of the upstream and downstream interior surfaces 34, 36 causes exhaust from the exhaust pipe 24 to swirl or circulate within the interior volume 30.

Since the reductant from an injector mounted at the injector mounting location 32 is sprayed through the interior volume 30, portions of the reductant can become mixed/ entrapped in the swirling exhaust and can remain in the interior volume 30 for extended periods of time thereby increasing the likelihood that portions of the reductant will become deposited within the stand-off tube 22. Furthermore, the stand-off tube 22 has an outer surface exposed to atmosphere which can cause cooling of the interior surface arrangement 23 of the stand-off tube 22 thereby exacerbating the deposition problem.

Figure 2:
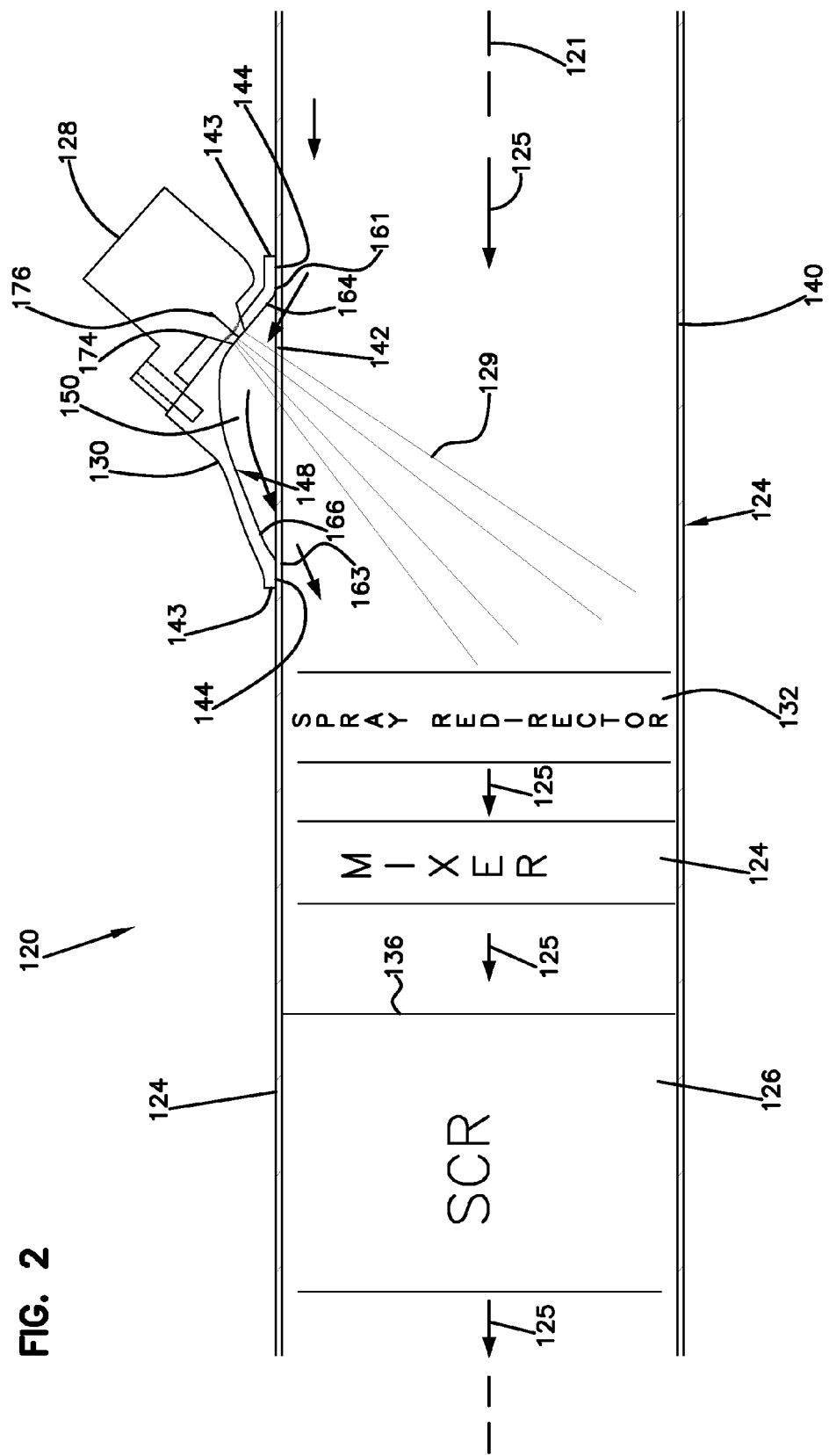
FIG. 2 shows an exhaust treatment system in accordance with the principles of the present disclosure.

FIG. 2 shows an exhaust treatment system 120 in accordance with the principles of the present disclosure. The exhaust treatment system 120 includes an exhaust conduit such as an exhaust pipe 124 through which an engine exhaust stream flows in a direction indicated by arrows 125. The exhaust treatment system 120 also includes an exhaust treatment device 126 such as an SCR substrate mounted within the exhaust pipe 124, and a reductant dispenser such as an injector 128 for dispensing (e.g., spraying) a reductant into exhaust stream at a reductant dispensing location upstream from the exhaust treatment device 126. The injector 128 is mounted to the exhaust pipe via an injector mounting structure 130 secured to an exterior of the exhaust pipe 124. The exhaust treatment system 120 further includes a spray redirector 132 and a flow mixer 124 that are mounted between the reductant dispensing location and the exhaust treatment device 126. The injector 128 has a spray cone 129 aimed generally toward the spray redirector 132 and the spray redirector 132 is configured to reduce the likelihood for reductant to form deposits within the exhaust pipe 124 at a location opposite from the injector 128. The mixer 134 is configured to improve exhaust flow uniformity at an upstream face 136 of the exhaust treatment device 126.

The exhaust pipe 124 includes a pipe wall 140 defining a side opening 142. The injector mounting structure 130 is secured to an exterior surface of the pipe wall 140 at a location in which the injector mounting structure 130 covers the side opening 142 of the pipe 124. For example, the injector mounting structure 130 includes a 143 base having a base surface 144 that contacts the exterior surface of the pipe wall 140 and that extends completely around a periphery of the side opening 142. The base surface 144 can have a curvature C1 (see FIGS. 5 and 7) that matches a curvature defined by the exterior surface of the exhaust pipe 124 (e.g., the outer diameter of the exhaust pipe 124). In certain embodiments, the base 143 of the injector mounting structure 130 can be welded or otherwise secured to the exterior surface of the exhaust pipe 124.

The injector mounting structure 130 includes an interior surface arrangement 148 defining an interior volume 150. When the injector mounting structure 130 is mounted to the exhaust pipe 124, the side opening 142 of the exhaust pipe 124 provides fluid communication between the interior of the exhaust pipe 124 and the interior volume 150 of the injector mounting structure 130. The interior volume 150 is preferably shaped to reduce or minimize the likelihood for exhaust to swirl or circulate within the interior volume 150 for an extended period of time. Thus, rather than swirling, the flow can generally make a single pass through the interior volume 150. This type of configuration assists in preventing reductant (e.g., a water-urea solution) sprayed from the injector 128 from depositing within the interior volume 150.

Referring to FIG. 2, the side opening 142 defined through the wall 140 of the pipe 124 has an upstream end 161 and a downstream end 163. As shown at FIG. 4, the interior surface arrangement 148 of the injector mounting structure 130 includes an upstream interior surface 164 positioned adjacent the upstream end 161 of the opening 142, a downstream interior surface 166 positioned adjacent the downstream end 163 of the opening 142, and an intermediate interior surface 168 that provides a transition between the upstream portion interior surface 164 and the downstream interior surface 166. The upstream interior surface 164 starts at the upstream end 161 of the side opening 142 and angles outwardly from the upstream end 161 of the side opening 142 in a downstream direction (i.e., in the same direction as arrows 125). The downstream interior surface 166 of the interior surface arrangement 148 starts at the downstream end 163 of the side opening 142 and angles outwardly from the downstream end 163 of the side opening 142 in an upstream direction (i.e., the opposite direction of arrows 125). The intermediate interior surface 168 provides an angle transition between the upstream interior surface 164 and the downstream interior surface 166. The relative arrangement of the surfaces 164, 166 and 168 helps to reduce recirculation of exhaust within the interior volume as compared to prior art systems such as the prior art system shown at FIG. 1.

Figure 7:
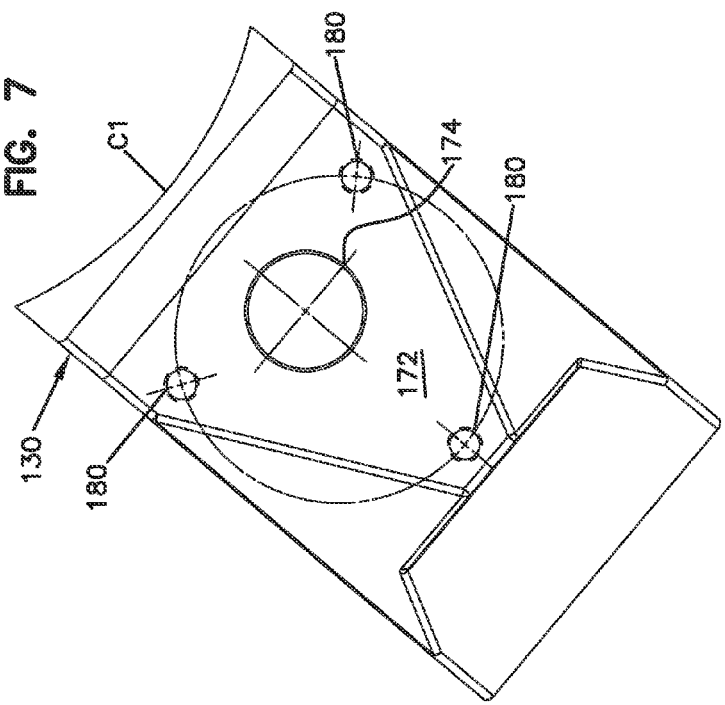
FIG. 7 is a plan view taken from viewing perspective 7-7 of FIG. 6.

In the depicted embodiment, the injector mounting structure 130 includes an upstream wall 170 that defines the upstream interior surface 164 and also defines an exterior injector mounting surface 172. The upstream wall 170 is depicted as being generally straight such that the upstream interior surface 164 and the exterior mounting surface 172 each have a generally planar configuration. The planar configuration of the exterior injector mounting surface 172 facilitates securing the injector 128 thereto. Referring to FIGS. 4 and 7, the exterior injector mounting surface 172 has a generally triangular configuration. An injector nozzle receiving opening 174 or port is defined through the upstream wall 170 for receiving a nozzle 176 of the injector 128. The opening 174 preferably has a depth selected such that a tip of the nozzle 176 is generally flush with the upstream interior surface 164 when the injector 128 is mounted to the exterior injector mounting surface 172. The injector mounting structure 122 also includes features for facilitating fastening or otherwise securing the injector 128 to the exterior injector mounting surface 172. For example, as shown at FIG. 7, the upstream wall 170 defines a plurality of attachment holes 180 that are spaced around the injector nozzle receiving opening 174. The attachment holes 180 can include blind holes that are internally tapped with threads so as to be configured to receive fasteners such as bolts used to secure the injector 128 to the injector mounting structure 122.

The downstream interior surface 166 has a curvature C2 (shown at FIG. 6) that extends in a direction parallel to a central axis 121 of the exhaust pipe 124, and a curvature C3 (shown at FIG. 5) that extends in a direction transverse to the central axis 121 of the exhaust pipe 124. The curvature C2 preferably has a larger radius than the curvature C3. The curvature C2 extends along a length L1 of the interior volume 150 of the injector mounting structure 122 while the curvature C3 extends across a width W1 of the interior volume 150. The length L1 is preferably greater than the width W1. In one embodiment, the length L1 is at least 1.5 times or at least 2 times as great as the width W1. The length L1 is defined as the maximum length of the interior volume 150 and the width W1 is the maximum width of the interior volume 150. The curvature C1 of the base preferably has a larger radius than the curvature C3 and a smaller radius than the curvature C2.

Figure 6:
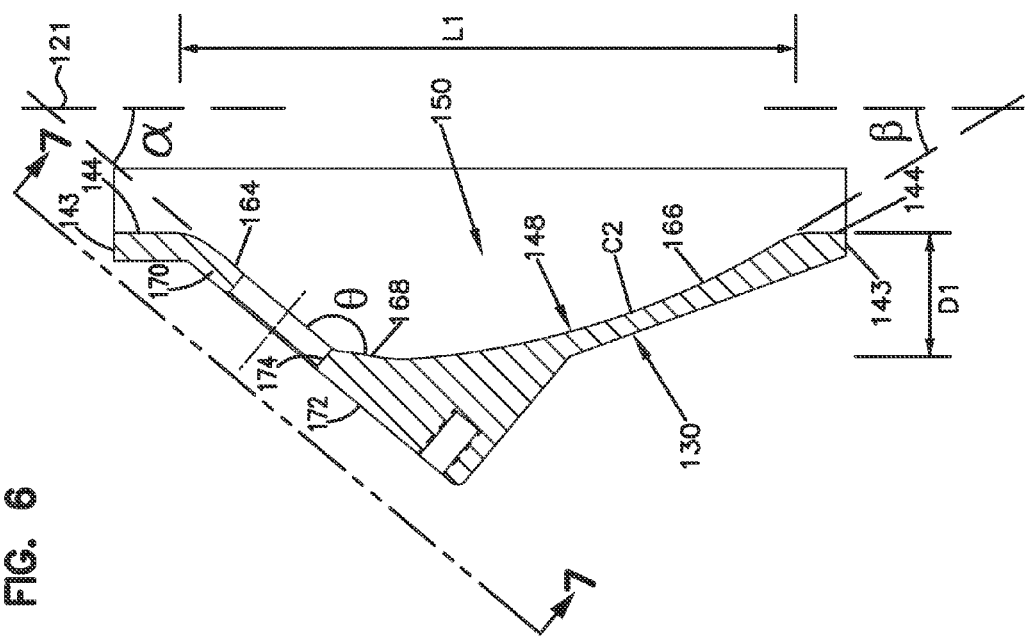
FIG. 6 is a cross-sectional view taken along section line 6-6 of FIG. 3.
Figure 8:
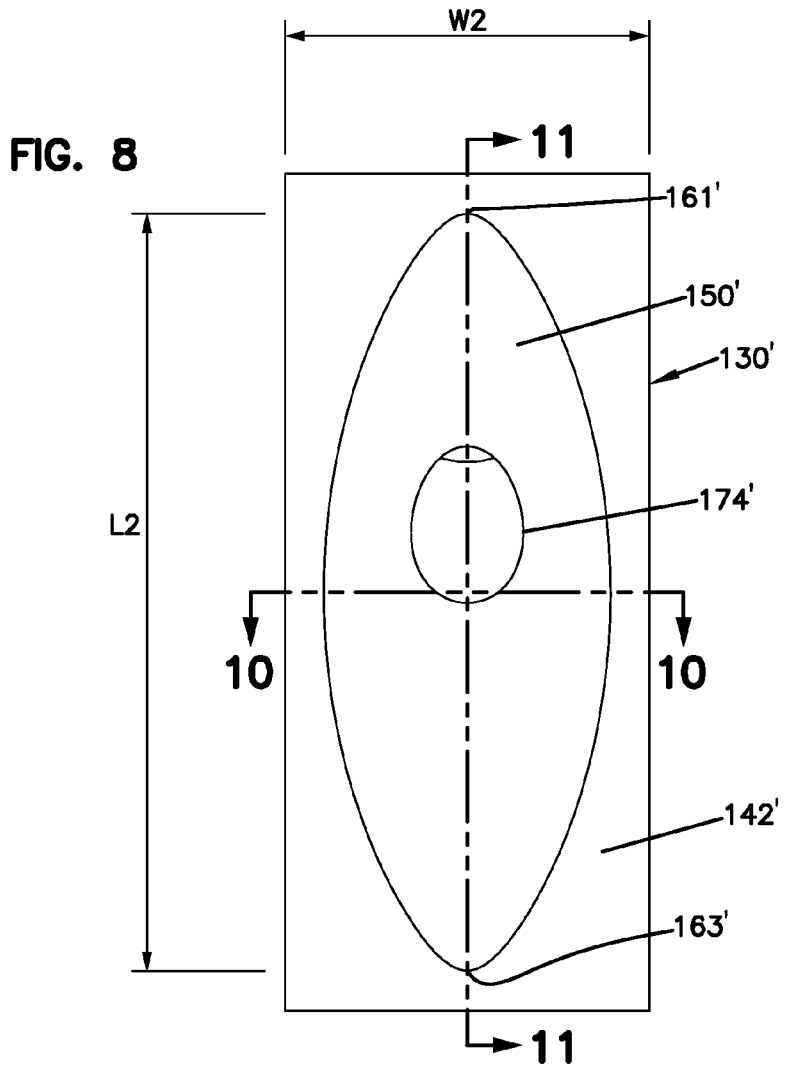
FIG. 8 is a bottom plan view of an alternative injector mounting structure in accordance with the principles of the present disclosure.
Figure 9:
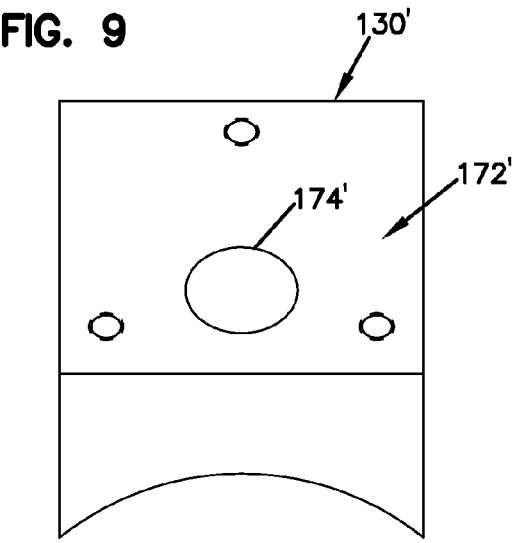
FIG. 9 is an upstream end view of the injector mounting structure of FIG. 8.
Figure 10:
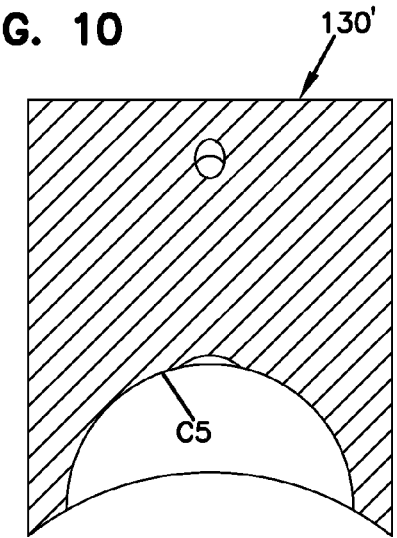
FIG. 10 is a cross-sectional view taken along section line 10-10 of FIG. 8.

The intermediate interior surface 168 provides an angular transition between the upstream interior surface 164 and the downstream interior surface 166. The intermediate interior surface 168 is depicted in FIG. 6 can have a curvature in a direction parallel to the central axis 121, or could be planar.

Referring to FIG. 4, the upstream interior surface 164 preferably defines an angle α relative to the central longitudinal axis 121 of the exhaust pipe 124. In one embodiment, the angle α is in the range of 20 to 60 degrees. In another embodiment, the angle α is in the range of 30 to 50 degrees. In still another embodiment, the angle α is about 40 degrees.

Referring still to FIG. 4, the downstream interior surface 166 defines an angle β relative to the central longitudinal axis 121 of the exhaust pipe 124. In one embodiment, the angle β is in the range of 10 to 50 degrees. In another embodiment, the angle β is in the range of 40 to 20 degrees. In still another embodiment, the angle β is about 28 degrees. In certain embodiments, the angle α to be larger than the angle β to assist in mounting the injector to the injector mounting structure at a desired angle relative to the exhaust pipe while maintaining suitable flow-through characteristics. In one embodiment, the angle α is at least 1.5 times larger than the angle β.

The intermediate interior surface 168 defines a transition between the upstream interior surface 164 of the downstream interior surface 166. As shown at FIG. 4, the intermediate interior surface 168 defines an angle θ relative to the upstream interior surface 164. In one embodiment, the angle θ is in the range of 130 to 170 degrees. In another embodiment, the angle θ is in the range of 140 to 160 degrees. In still another embodiment, the angle θ is about 153 degrees.

Referring to FIG. 3, the interior volume 150 of the injector mounting structure 130 has a boundary 190 defined by an inner edge 191 of the base surface 144 that is generally teardrop shaped. The width W1 (i.e., the maximum width) of the interior volume 150 is located at the intermediate interior surface 168. From the maximum width W1, the width of the interior volume 150 tapers inwardly as the interior volume 150 extends in either an upstream or downstream direction. From the width W1, the width of the interior volume 150 has a steeper taper angle as the interior volume extends in an upstream direction and a more gradual taper angle as the interior volume extends in a downstream direction.

Referring again to FIG. 4, the interior volume 150 also has a depth D1 that is smaller than the length L1. The depth D1 is defined as a maximum depth of the interior volume 150. In certain embodiments, the length L1 is at least 1.5 times as large as the depth D1. In other embodiments, the length L1 is at least 2 times as large as the depth D1. In one embodiment, the length L1 is in the range of 3 to 6 inches, the depth D1 is in the range of 0.5 to 1.5 inches, and the width W1 is in the range of 1 to 3 inches.

It is preferred for the nozzle of the injector 128 to be aimed such that the spray of reductant impinges upon the spray redirector 132 rather than the side of the exhaust pipe 124 that is located opposite from the injector 128. The spray redirector 132 is preferably made of a material that facilitates a high rate of heat transfer from the exhaust to the spray redirector. In this way, the spray director, which is located inside the exhaust pipe 124 and does not have significant surface area exposed to outside air, remains hot. Therefore, the spray from the injector 128 is directed at hot surfaces that do not encourage the deposition of the reductant. This is in contrast to the wall of the exhaust pipe 124 that has an outer surface exposed to cool air which can cause cooling of the wall 124. It is noted that in FIG. 2, a portion of the stream from the injector 128 is aimed partially at the opposite portion of the bottom wall of the exhaust pipe 124. However, it will be appreciated that the flow of exhaust within the exhaust pipe 124 will carry this portion of the spray into the spray redirector 132 such that contact with the bottom wall of the exhaust pipe 124 is avoided. The spray redirector 132 can have a variety of different configurations such as a wire mesh disk, a porous disk, a perforated plate, a mixer plate including a plurality of vanes, fins, or louvers, a fibrous disk, a substrate having axial passages/channels defined by corrugated metal sheets, or other structure.

In certain embodiments, it is desirable to reduce or minimize the interior volume defined within the injector mounting structure. In one example embodiment, the interior volume of the injector mounting structure is less than 3.5 cubic inches.

FIGS. 8-12 show an alternative injector mounting structure 130' in accordance with the principles of the present disclosure. The injector mounting structure 130' includes an interior volume 150' having a length L2, a width W2, and a depth D2. The interior volume 150' is generally dome-shaped and has a curvature C4 of constant radius that extends along the entire length L2 of the interior volume from an upstream end 161' to the downstream end 163'. The interior volume 150' also has a curvature C6 in the direction of the width W2. The curvature C5 is provided throughout the entire interior surface of the injector mounting structure 130'. Additionally, an upstream surface 164' of the interior mounting structure 130' has an exhaust entrance angle x that is generally equal (i.e., equal or about equal) to an exhaust exit angle y defined by a downstream surface 166' of the injector mounting structure 130'. In certain embodiments, the angles x and y are each in the range of 10-50 degrees. The injector mounting structure 130' also includes a base 142', an exterior injector mounting location 172', and a port 174' for receiving an injector nozzle.

What is claimed is:
1. An exhaust treatment system comprising:
an exhaust conduit having a pipe wall defining a side opening;
an injector mounting structure coupled to the exhaust conduit at the side opening, the injector mounting structure having a base surface configured as a curved plate mounted to an exterior surface of the exhaust conduit so as to cover the side opening, the injector mounting structure having an exterior injector mounting surface, the injector mounting structure also including an interior surface arrangement defining an interior volume in fluid communication with an interior of the exhaust conduit, the injector mounting structure further including a port extending through the injector mounting structure from the exterior injector mounting surface to the interior volume, the interior surface arrangement being configured to prevent swirling of exhaust within the interior volume;

the interior volume including a length that extends from an upstream end of the interior volume adjacent an upstream end of the side opening to a downstream end of the interior volume adjacent a downstream end of the side opening relative to exhaust flow in the exhaust conduit; and a spray redirector positioned within the exhaust conduit.

2. The exhaust treatment system of claim 1, wherein an upstream interior surface of the injector mounting structure defines an angle relative to a longitudinal axis of the exhaust pipe in the range of 20-60 degrees.

3. The exhaust treatment system of claim 1, further comprising an injector mounted at the exterior injector mounting surface, the injector including a nozzle positioned adjacent the port of the injector mounting structure, wherein the nozzle of the injector is oriented so that spray from the nozzle impinges upon the spray redirector.

4. The exhaust treatment system of claim 1, wherein the port extends through an upstream interior surface of the injector mounting structure.

* * * * *